(12) United States Patent
Smith

(10) Patent No.: US 6,308,151 B1
(45) Date of Patent: Oct. 23, 2001

(54) METHOD AND SYSTEM USING A SPEECH RECOGNITION SYSTEM TO DICTATE A BODY OF TEXT IN RESPONSE TO AN AVAILABLE BODY OF TEXT

(75) Inventor: Maria E. Smith, Plantation, FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/312,724

(22) Filed: May 14, 1999

(51) Int. Cl.[7] .................................................. G10L 15/26
(52) U.S. Cl. ............................................ 704/235; 704/255
(58) Field of Search .................................... 704/235, 260, 704/251, 231, 255, 257, 275, 256, 270, 272, 277

(56) References Cited

U.S. PATENT DOCUMENTS 5,634,086 * 5/1997 Rtischev et al. ...................... 704/275
5,675,706 * 10/1997 Lee et al. .............................. 704/256

OTHER PUBLICATIONS

ICASSP–95. Gauvain et al. "Developments in continuous speech dictation using the ARPA WSJ task". May 1995.*
IEEE Asia Pacific Conference Circuits and Systems. Lee, "Spontaneous dialogue recognition with large out–of–vocabularies". Nov. 1996.*
Proceeding of the 1998 IEEE International Conference on Acoustics Speech and Signal Processing, 1998. Geutner et al., "Adaptive vocabularies for transcribing multilingual broadcast news". May 1998.*

* cited by examiner

Primary Examiner—Richemond Dorvil
(74) Attorney, Agent, or Firm—Akerman Senterfitt

(57) ABSTRACT

A system and method is delineated for dictating a body of text in response to an available body of text. In the preferred embodiment, the available body of text comprises only the textual body in plain format from a received E-mail message, while the responsive body of text preferably comprises a dictated E-mail response. Each word from the selected text of the received E-mail message is compared against the speech recognition system's vocabulary to determine whether any words are out-of-vocabulary. Out-of-vocabulary words and their pronunciations are added to the system vocabulary. Similarly, new context information is extracted from the selected text of the received E-mail message, and used to update the system's language model. Thereafter, the user more accurately and efficiently dictates the responsive E-mail, and the system removes the updates to the system vocabulary and language model.

17 Claims, 4 Drawing Sheets

METHOD AND SYSTEM USING A SPEECH RECOGNITION SYSTEM TO DICTATE A BODY OF TEXT IN RESPONSE TO AN AVAILABLE BODY OF TEXT

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Technical Field

This invention relates to the field of speech recognition computer applications and more specifically to a system for automatically updating a speech recognition system's vocabulary and language model with new words and context information, respectively, extracted from text of an incoming E-mail message in order to improve dictation accuracy of the E-mail response.

2. Description of the Related Art

Speech recognition is the process by which acoustic signals received by microphone are converted to a set of words by a computer. These recognized words may then be used in a variety of computer software applications for purposes such as document preparation, data entry, and command and control. Speech recognition is generally a difficult problem due to the wide variety of pronunciations, individual accents and speech characteristics of individual speakers. Consequently, language models are often used to help reduce the search space of possible words and to resolve ambiguities as between similar sounding words. Language models tend to be statistically based systems and can be provided in a variety of forms. The simplest language model can be specified as a finite state network, where the permissible words following each word are given explicitly. However, more sophisticated language models have also been developed which are specified in terms of probabilities of word sequences.

Conventional speech recognition systems permit language models to be updated by analyzing samples of existing text. The analysis process in such conventional systems involves a process whereby the speech recognition software compiles statistics relating to the likelihood that a particular word precedes or follows some other word. A bigram model or sometimes a trigram is typically used to represent this data with regards to certain word pairs or even triplets. The analysis process is typically initiated by conventional systems when a new user is established for the system, or when a user manually initiates the analysis process.

It would be desirable to provide a method of allowing a speech recognition system to automatically determine whether to update the language model using a particular existing text. For similar reasons, when the speech recognition system determines appropriate the use of a particular existing text in updating the language model, it would also be desirable for the system to update the system vocabulary to include new words from the subject text.

Such a method would be particularly desirable in the context of using a speech recognition system to dictate an E-mail response to an incoming E-mail message. The reason for this stems from the fact that: 1) an E-mail response typically involves the same subject matter as the incoming E-mail message; and 2) most E-mail authors compose messages which include creative, informal, or unusual words and phrases. Conventional speech recognition vocabularies and language models simply do not account for such atypical language, as the vocabularies and models have finite capacity incapable of including the wide variety of atypical words and phrases that may be used in E-mail messages. For example, the incoming message may contain specific names of individuals, businesses, projects, etc., which are often not included in general purpose vocabularies with a limited vocabulary size. Therefore, the words used in the incoming message and their context are likely to be useful for improving the accuracy of the dictated response.

The present approach consists of dictating the E-mail response, including atypical words borrowed from the prompting E-mail message. The problem is that the system vocabulary and language model will not include the atypical language, and therefore, certain words from the dictated text will be misrecognized by the speech recognition system. Thus, the user must correct the erroneous words using a computer keyboard, an inconvenience users prefer to avoid.

Accordingly, there is a need to provide a system facilitating more efficient dictation of E-mail responses to incoming E-mail messages.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
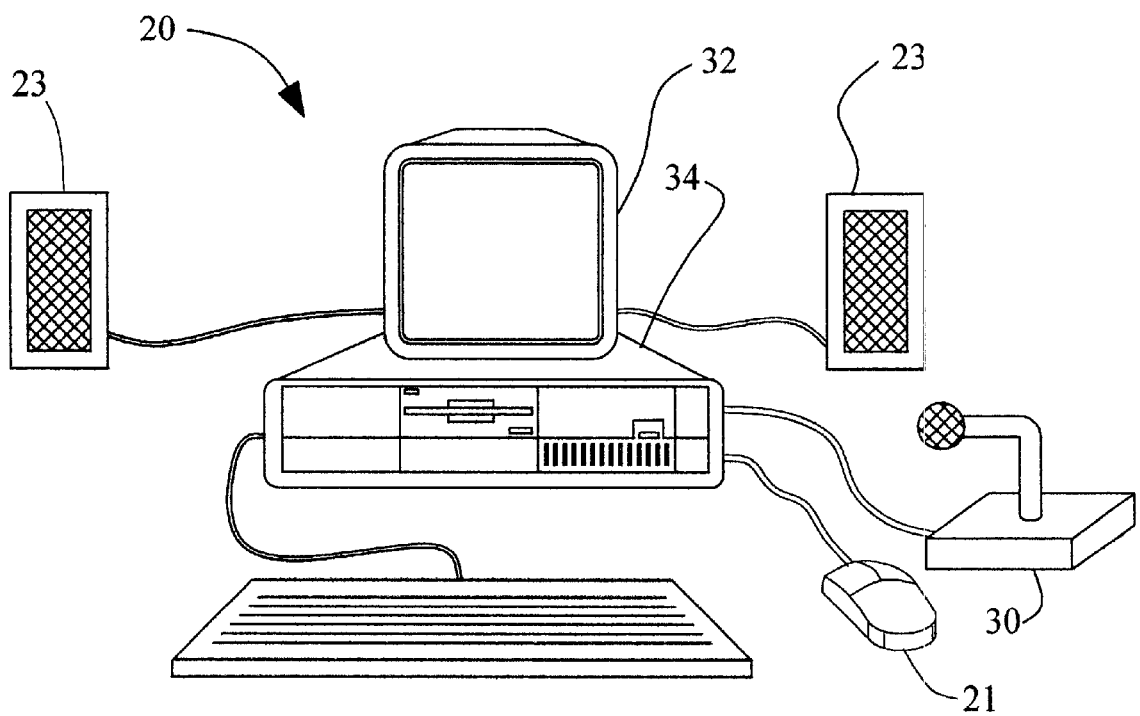
FIG. 1 shows a computer system for speech recognition on which the system of the invention may be used.

FIG. 1 shows a typical computer system 20 for use in conjunction with the present invention. The system is preferably comprised of a computer 34 including a central processing unit (CPU), one or more memory devices and associated circuitry. Computer system 20 also includes a microphone 30 operatively connected thereto through suitable interface circuitry such as a "sound board" (not shown), and at least one user interface display unit 32 such as a video data terminal (VDT) operatively connected thereto. The CPU may comprise any suitable microprocessor or other electronic processing unit, as is well known to those skilled in the art. An example of such a CPU would include any member of the family of Pentium-brand microprocessors available from Intel Corporation or any similar microprocessor. Speakers 23, as well as an interface device, such as mouse 21, may also be provided with system 20, but are not necessary for operation of the invention as described herein.

The various hardware requirements for computer system 20 as described herein can generally be satisfied by any one of many commercially available high speed multimedia personal computers offered by manufacturers such as International Business Machines Corporation (IBM), Compaq, Hewlett Packard, or Apple Computers.

Figure 2:
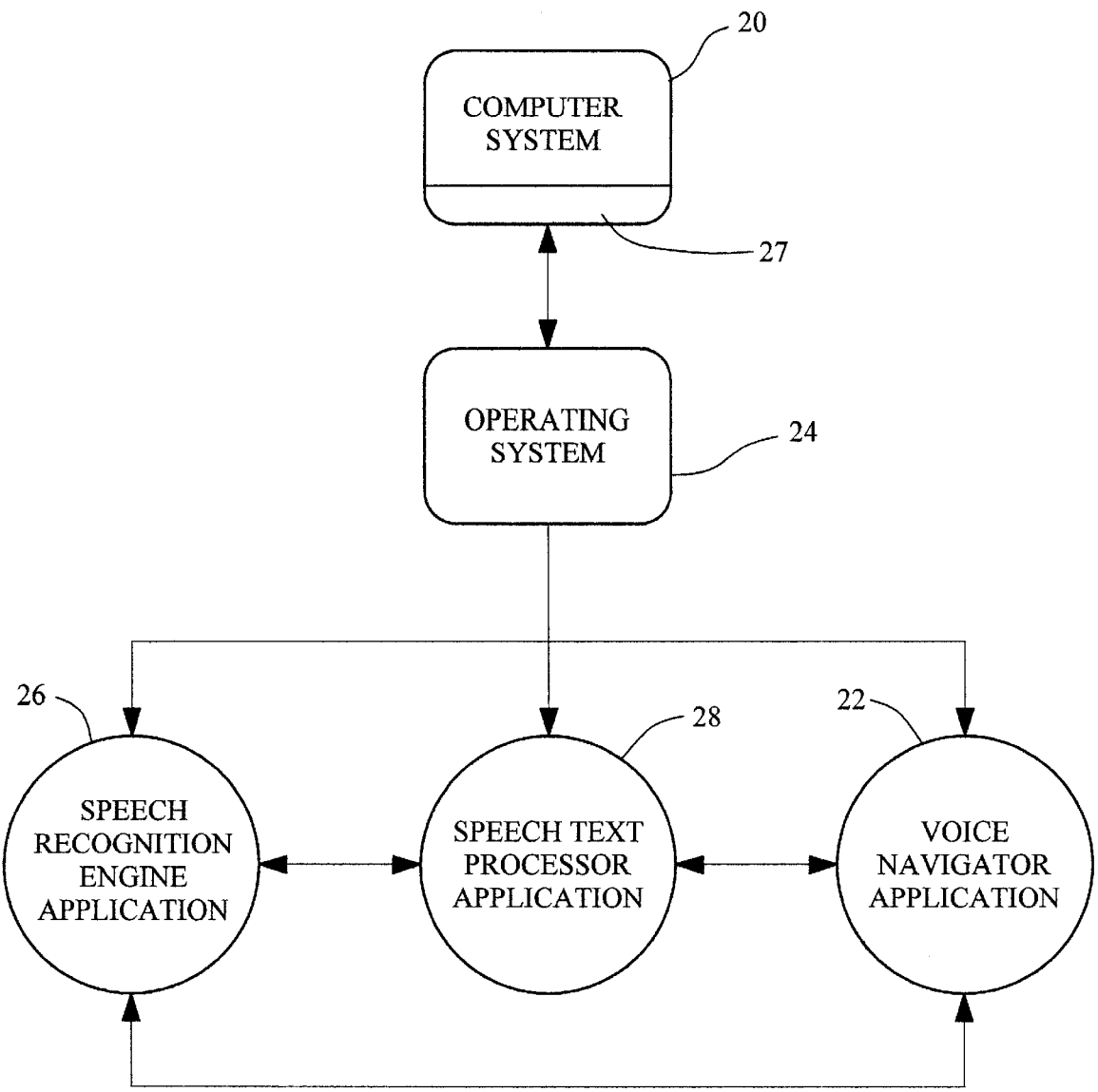
FIG. 2 is a block diagram showing a typical high level architecture for the computer system in FIG. 1.

FIG. 2 illustrates a typical architecture for a speech recognition system in computer system 20. As shown in FIG. 2, the speech recognition system typically includes an operating system 24 and a speech recognition engine application 26. A speech text processor application 28 and a voice navigator application 22 may also be provided.

In FIG. 2, the speech recognition engine 26, speech text processor 28, and the voice navigator 22 are shown as separate application programs. The invention is not limited in this regard, as these various applications could be implemented as a single, more complex application program. Also, if no other speech controlled application programs are to be operated in conjunction with the speech text processor application 28 and speech recognition engine 26, then the system may be modified to operate without the voice navigator application 22. The voice navigator 22 primarily helps coordinate the operation of the speech recognition engine application 26.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention may also be used with any other type of computer operating system. The system as disclosed herein can be implemented by a programmer, using commercially available development tools for the operating systems described above. As shown in FIG. 2, computer system 20 includes computer memory 27, which preferably comprises an electronic random access memory and a bulk data storage medium, such as a magnetic disk drive.

Audio signals representative of sound received in microphone 30 are processed within computer system 20 using conventional computer audio circuitry so as to be made available to operating system 24 in digitized form. The audio signals received by computer system 20 are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
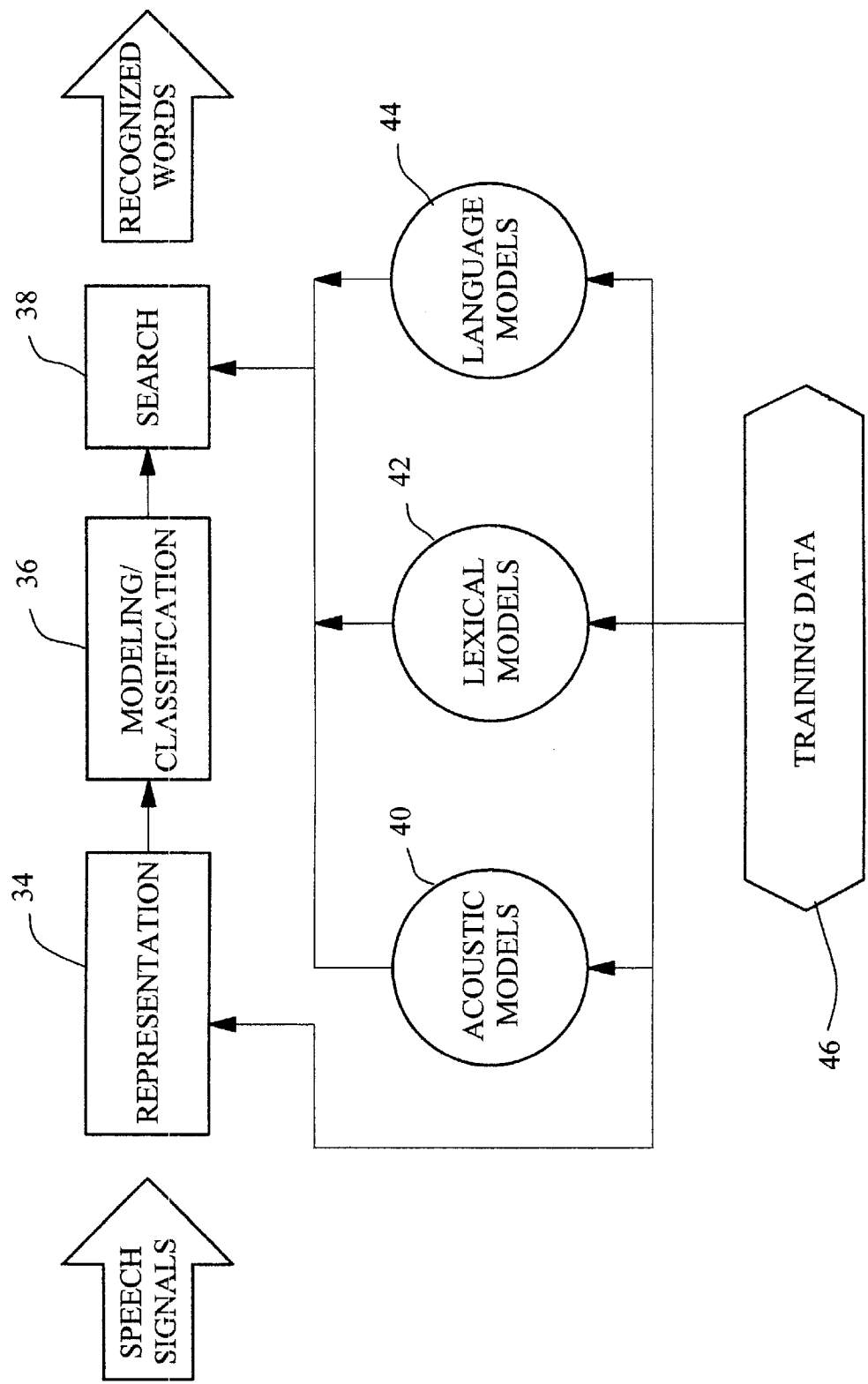
FIG. 3 is a block diagram showing a typical architecture for a speech recognition engine.

FIG. 3 is a block diagram showing typical components comprising speech recognition application 26. As shown in FIG. 3, speech recognition engine 26 receives a digitized speech signal from operating system 24. The signal is subsequently transformed in representation block 35 into a useful set of data by sampling the signal at some fixed rate, typically every 10–20 msec. Representation block 35 produces a new representation of the audio signal which can then be used in subsequent stages of the voice recognition process to determine the probability that the portion of waveform just analyzed corresponds to a particular phonetic event. This process is intended to emphasize perceptually important speaker-independent features of the speech signals received from operating system 24. In modeling/classification block 36, algorithms process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42 and language models 44.

Language model 44 is used to help restrict the number of possible words corresponding to a speech signal when a word is used together with other words in a sequence. Language model 44 consists of statistical information used to determine the probability that a given word follows the previously decoded words. Because users' writings vary significantly both in subject and style, it is often desirable to update the content of the language model 44 with information concerning speech patterns likely to be encountered during a specific user's dictation. These updates adapt the language model probabilities for a user's particular dictation session, thereby improving that user's recognition accuracy. One particular instance in which one can be fairly certain of the subject matter of a user's dictation is when a user is responding to an incoming E-mail message. In order to improve the recognition accuracy of the user's dictated E-mail response, the system and methodology disclosed herein uses the content of the received E-mail message to update the language model 44 for the user's dictation session responding to the received E-mail message. Similarly, the content of the received E-mail message is used to update the speech recognition system's vocabulary (not shown) for the responsive dictation session. Preferably, after the user has finished dictating the response, the updates to the system vocabulary and language model 44 are automatically removed.

Figure 4:
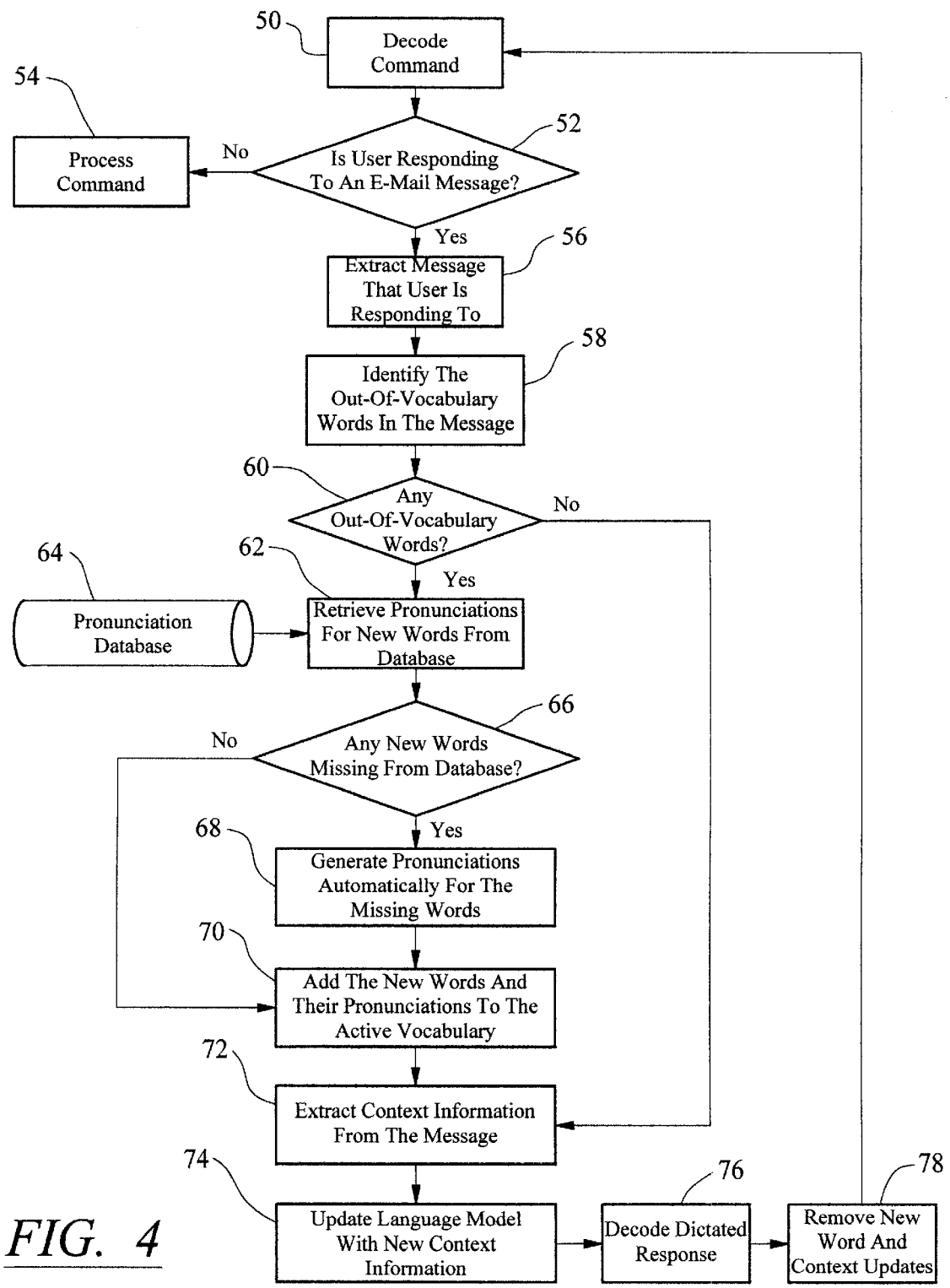
FIG. 4 is flow chart illustrating a process for dictating a body of text in response to an available body of text.

FIG. 4 is a flow chart illustrating how a speech recognition system may automatically update its system vocabulary and language model 44 with already available text, such as an E-mail message, in order to more efficiently and accurately dictate a response thereto. The system disclosed in FIG. 4 and in the accompanying description below can be implemented by a programmer, using commercially available development tools for the operating systems previously described. Moreover, the system may be implemented as part of the voice navigator 22, though preferably only logic blocks 50–54 are implemented as part of voice navigator 22, while a separate body connected to the speech recognition engine 26 and the voice navigator 22 comprises the remaining logic blocks of FIG. 4. However, regardless of where the system of FIG. 4 is situated, its operation and significance, as discussed below, remains the same.

As a precursor to step 50, a user speaks a command, which is decoded by the speech recognition engine 26 in a well known manner. In step 50, the voice navigator 22 receives the decoded command from the speech recognition engine 26. In step 52, the decoded command is compared against a library of decoded commands, each corresponding to a verbal command that a user might speak to prompt generation of an E-mail message responding to a received E-mail communication. For example, Microsoft Corporation provides a standard for writing applications involving E-mail messaging called "MAPI," standing for Messaging Application Program Interface. MAPI establishes a specified set of commands for replying to an E-mail message that could be implemented into the library of step 52. If the decoded command received by voice navigator 22 does not match one of the decoded commands in the library, the user is not responding to an E-mail message. Thus, the decoded command is processed in step 54 and the remainder steps of FIG. 4 are omitted, at least until a new decoded command is received by voice navigator 22 prompting the same test. Assuming the decoded command matches one of the decoded commands of the library from step 52, the user is responding to an E-mail message, and the remaining steps of FIG. 4 are therefore executed.

In step 56, the E-mail message prompting the user's E-mail response is extracted for use in updating the speech recognition system's vocabulary with new words, and for updating the system's language model 44 with new context information. The extraction of the prompting E-mail message is done in any manner well know to those skilled in the art. In the preferred embodiment, the extracted message includes only the body of text from the prompting E-mail message, excluding from updating consideration, for example, the message header (e.g., from line, to line, subject line, date line, carbon copy and blind carbon copy lines), any message signature block, and any files sent as an attachment to the prompting E-mail message. Moreover, the body of text from the prompting E-mail message is preferably extracted as plain text, removing from consideration any special formatting commands from the text, such as a bold or an underline command.

The body of plain text from the prompting E-mail message is preferred for updating purposes, as it is statistically reasonable to conclude that this information provides meaningful improvement to the operation of the speech recognition system in dictating an E-mail response. However, various of the above identified elements preferably excluded from consideration in updating the system vocabulary and language model 44 may nevertheless be extracted from the prompting E-mail message and used for such updating, if desired.

With the desired text now extracted from the prompting E-mail message, it is used to update the speech recognition system in two ways, namely, by the addition of new words to the system vocabulary, and by the addition of new context information to the language model 44. In FIG. 4, the system vocabulary is updated before the language model 44, though the order could be reversed, if desired.

In steps 58–60, out-of-vocabulary words are identified (if any) by comparing words from the extracted text of the prompting E-mail message against words already existing within the system vocabulary, which typically occupies part of the speech recognition engine 26, though it may reside elsewhere. If there are no out-of-vocabulary words, no new words are added to the system vocabulary, as signified by a direct transition to step 72 to begin the context information updating routine.

If there are out-of-vocabulary (i.e., new) words, in step 62 stored pronunciations for the new words are retrieved in a conventional manner from pronunciation database 64, assuming that pronunciation database 64 includes the new words from the extracted text. In step 66, the group of new words is compared against the collection of pronunciations added in step 62 to determine whether pronunciations for any new words were missing from database 64. If pronunciations were retrieved for all of the new words, a transition is made to step where the new words and their pronunciations are temporarily added to the system vocabulary in a well known manner.

However, if pronunciations were not retrieved for some or all of the new words, as determined at step 66, pronunciations are automatically generated in a conventional manner at step 68. Preferably, the generated pronunciations are obtained from the spelling of the subject words, using a text-to-speech engine application. In the typical scenario, some new word pronunciations will be retrieved from pronunciation database 64, while some will be automatically generated at step 68. Regardless of the manner in which they are obtained, all the new words and corresponding pronunciations are temporarily added to the system vocabulary at step 70.

In step 72, context information is conventionally extracted from the same selected text of the prompting E-mail message used to obtain new word and pronunciation updates. Those skilled in the art understand that context information is statistical in nature, concerning the likelihood that a particular word precedes or follows another, and typically resides in a language model, like model 44. The language model 44 may include unigrams, bigrams, trigrams, or any other well known word-mapping scheme. In step 74, the extracted context information is used to temporarily update language model 44.

Having now updated the system vocabulary and language model 44 with new words and context information, respectively, from the prompting E-mail's selected text, the user dictates a responsive E-mail at step 76. The user need not worry that the dictated E-mail response may borrow certain unusual or atypical words and phrases from the prompting E-mail message, as the speech recognition system has been temporarily updated to efficiently and accurately recognize them.

After the responsive E-mail has been dictated to the user's satisfaction, the new word and context information updates are removed from the system at step 78. The updates are removed because at least some of them likely represent atypical words and context information that may degrade speech recognition for purposes other than dictating an E-mail response to the prompting E-mail message from which the updates were extracted. To facilitate automatic removal of the updates, they may be flagged, using conventional techniques, to be removed following satisfactory dictation of the E-mail response.

However, considering the frequently occurring situation were a user receives from and sends to the same individual a series of related E-mail messages, it may be desirable to delay removal of the updates until after the sequence of related E-mails has been completed. Thus, conventional delaying schemes may be implemented, if desired. Automated delaying schemes may comprise a fixed time delay following satisfactory dictation of a responsive E-mail, a delay based on a countdown of the number of received E-mail messages, or any other conventional technique for delaying removal of the updates. Moreover, a manually-based delay is envisioned wherein the system prompts the user to decide after each E-mail dictation session whether or not to purge the latest updates. Whether removal of the updates is delayed or not, after the E-mail response is dictated, the system transitions back to step 50 to wait for receipt of the next decoded command.

While the foregoing specification illustrates and describes the preferred embodiments of this invention, it is to be understood that the invention is not limited to the precise construction herein disclosed. The invention can be embodied in other specific forms without departing from the spirit or essential attributes. Importantly, while the preferred embodiments have been disclosed in the context of dictating an E-mail response to a prompting E-mail message, the invention also applies to the more general case of dictating a body of text in response to another body of text already available to the user. Thus, by way of example, the invention could be used to dictate a response in chat room communications, in news group communications, or in voicemail communications, assuming the received voicemail is first converted to text. Accordingly, reference should be made to the following claims, rather than to the foregoing specification, as indicating the scope of the invention.

What is claimed is:

1. In a computer system for speech recognition, a method for dictating a body of text in response to an available body of text comprising the steps of:

retrieving from a memory the available body of text;

identifying out-of-vocabulary words from the available body of text by comparing each word from the available body of text against words in the speech recognition system's vocabulary;

updating the system's vocabulary to temporarily include the out-of-vocabulary words;

dictating the responsive body of text; and removing the out-of-vocabulary words from the system's vocabulary after dictating the responsive body of text.

2. The method according to claim 1 further comprising the steps of:

retrieving pronunciations of the out-of-vocabulary words from a pronunciation database;

generating pronunciations of the out-of-vocabulary words not having pronunciations in the database;

updating the system's vocabulary to temporarily include the retrieved and generated pronunciations; and removing from the system's vocabulary the retrieved and generated pronunciations after dictation of the responsive body of text.

3. The method of claim 2 wherein the out-of-vocabulary words, and the retrieved and generated pronunciations are removed from the system's vocabulary following an interval beginning after dictation of the responsive body of text and running for a period of time calculable in a predetermined manner.

4. The method according to claim 1 further comprising the steps of:

generating context information from the available body of text;

updating the system's language model to temporarily include the context information; and removing the context information generated from the available body of text after dictation of the responsive body of text.

5. The method of claim 4 wherein the context information updates are removed from the language model following an interval beginning after dictation of the responsive body of text and running for a period of time calculable in a predetermined manner.

6. The method according to claim 1 further comprising the step of determining whether a user's spoken command decodes into a command indicative of a situation where the user is responding to an E-mail message.

7. The method of claim 1 wherein the available body of text comprises a received E-mail message's body in plain text format.

8. The method of claim 1 wherein the dictated body of text comprises an E-mail message responsive to a received E-mail message.

9. A system for dictating a body of text in response to an available body of text comprising:

means for retrieving from a memory the available body of text;

means for identifying out-of-vocabulary words from the available body of text by comparing each word from the available body of text against words in the speech recognition system's vocabulary;

means for updating the system's vocabulary to temporarily include the out-of-vocabulary words;

means for dictating the responsive body of text; and means for removing the out-of-vocabulary words from the system's vocabulary after dictating the responsive body of text.

10. The system according to claim 9 further comprising:

means for retrieving pronunciations of the out-of-vocabulary words from a pronunciation database;

means for generating pronunciations of the out-of-vocabulary words not having pronunciations in the database;

means for updating the system's vocabulary to temporarily include the retrieved and generated pronunciations; and means for removing from the system's vocabulary the retrieved and generated pronunciations after dictation of the responsive body of text.

11. The system according to claim 9 further comprising:

means for generating context information from the available body of text;

means for updating the system's language model to temporarily include the context information; and means for removing the context information generated from the available body of text after dictation of the responsive body of text.

12. The system according to claim 9 further comprising means for determining whether a user's spoken command decodes into a command indicative of a situation where the user is responding to an E-mail message.

13. The system of claim 9 wherein the available body of text comprises a received E-mail message's body in plain text format.

14. The system of claim 9 wherein the dictated body of text comprises an E-mail message responsive to a received E-mail message.

15. A machine readable storage medium, having stored thereon a computer program having a plurality of code sections executable by a machine for causing the machine to perform the steps of:

retrieving from a memory an available body of text;

identifying out-of-vocabulary words from the available body of text by comparing each word from the available body of text against words in a speech recognition system's vocabulary;

updating the system's vocabulary to temporarily include the out-of-vocabulary words;

dictating a responsive body of text; and removing the out-of-vocabulary words from the system's vocabulary after dictating the responsive body of text.

16. The machine readable storage medium of claim 15 further causing the machine to perform the steps of:

retrieving pronunciations of the out-of-vocabulary words from a pronunciation database;

generating pronunciations of the out-of-vocabulary words not having pronunciations in the database;

updating the system's vocabulary to temporarily include the retrieved and generated pronunciations; and removing from the system's vocabulary the retrieved and generated pronunciations after dictation of the responsive body of text.

17. The machine readable storage medium of claim 15 further causing the machine to perform the steps of:

generating context information from the available body of text;

updating the system's language model to temporarily include the context information; and removing the context information generated from the available body of text after dictation of the responsive body of text.

* * * * *